A. W. TUFFORD.
POWER TRANSMISSION.
APPLICATION FILED JAN. 27, 1914.

1,120,867.

Patented Dec. 15, 1914.

3 SHEETS—SHEET 1.

WITNESSES:

INVENTOR:
Andrew Wallis Tufford
BY B. Singer
ATTORNEY.

A. W. TUFFORD.
POWER TRANSMISSION.
APPLICATION FILED JAN. 27, 1914.

1,120,867.

Patented Dec. 15, 1914.
3 SHEETS—SHEET 2.

WITNESSES

INVENTOR:
Andrew Wallis Tufford
By B. Singer
ATTORNEY.

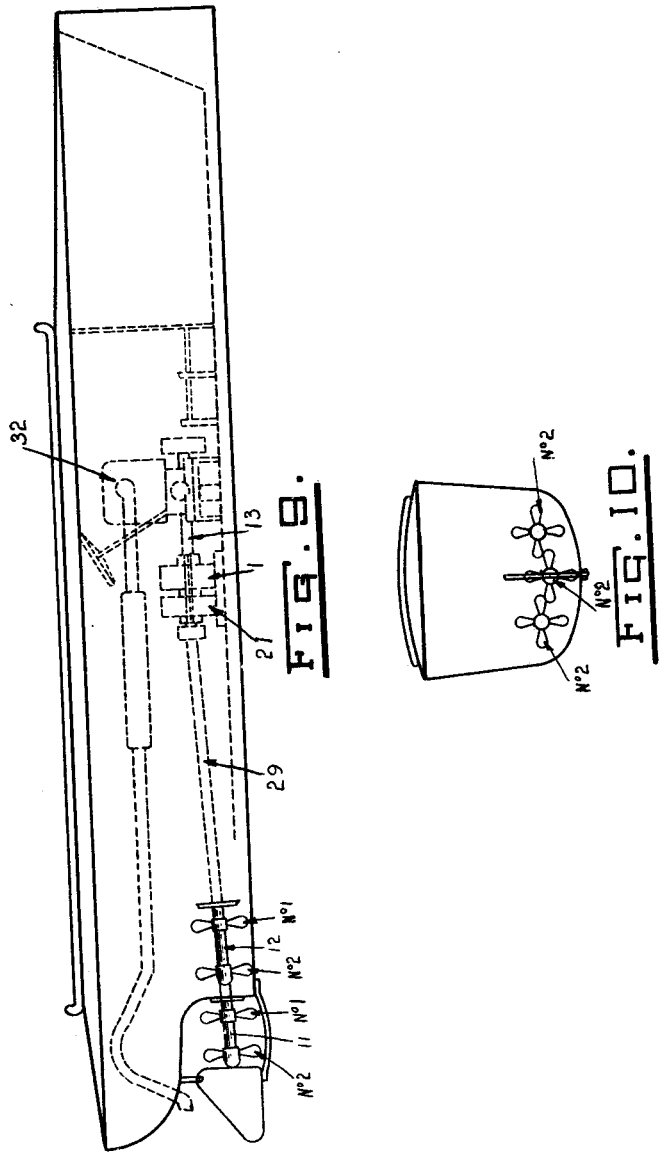

UNITED STATES PATENT OFFICE.

ANDREW WALLIS TUFFORD, OF TORONTO, ONTARIO, CANADA.

POWER TRANSMISSION.

1,120,867.  Specification of Letters Patent.  Patented Dec. 15, 1914.

Application filed January 27, 1914. Serial No. 814,689.

*To all whom it may concern:*

Be it known that I, ANDREW WALLIS TUF-FORD, a subject of the King of Great Britain, residing at Toronto, in the Province of Ontario, Dominion of Canada, have invented new and useful Improvements in Power Transmission, of which the following is a specification.

My invention relates to a transmission system for power boats and has as its principal object the provision of a transmission adapted for use between the motor and the propeller, or propellers of a power boat which shall enable the motor to be run at a high rate of speed and, at the same time, obtain a maximum efficiency from the propellers.

A further object of my invention is to provide a transmission whereby two propellers may be driven on the same shaft in opposite directions by the same engine.

A third object of my invention is to provide a plurality of shafts driven by the same engine, and means whereby a pair of propellers on each shaft may be driven in opposite directions by the same engine.

A final object of my invention resides in the particular arrangement and combination of parts hereinafter described.

Figure 1:
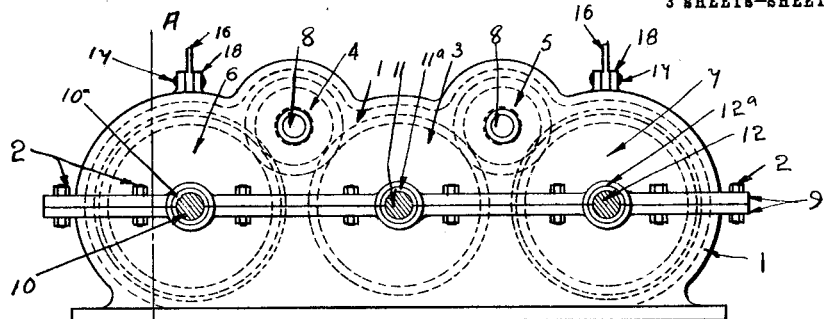
Figure 2:
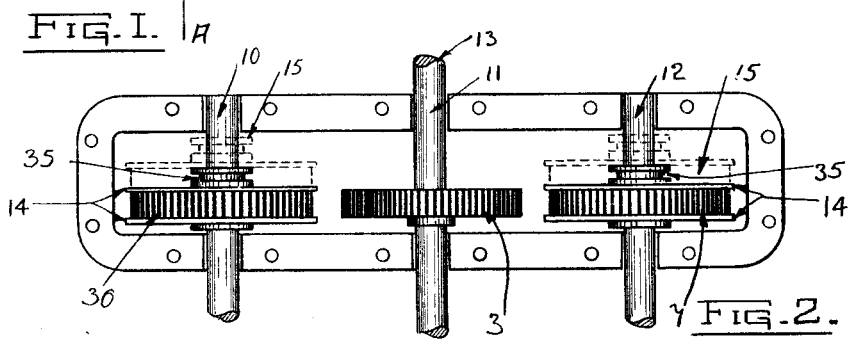
Figure 3:
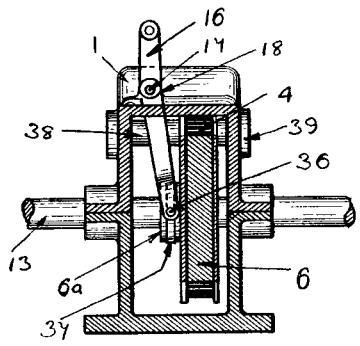
Figure 4:
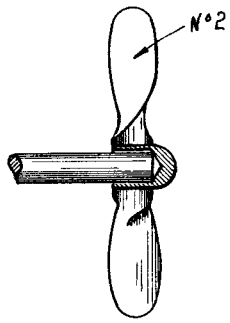
Figure 5:
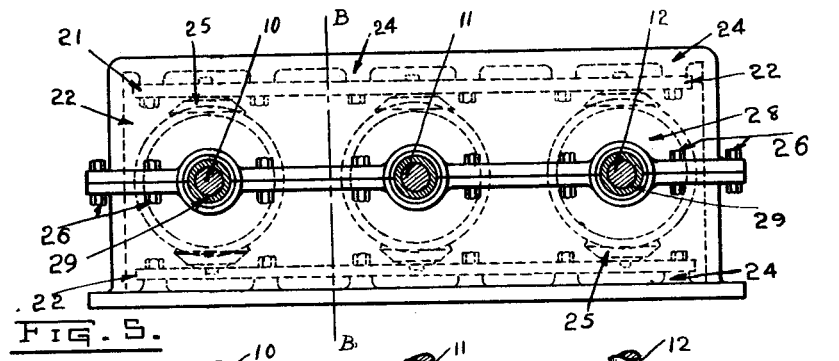
Figure 6:
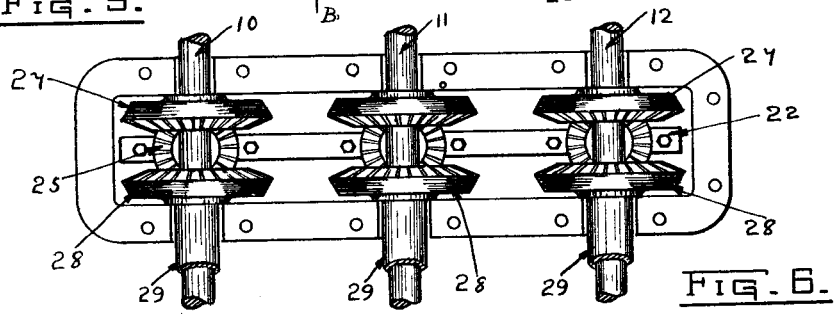
Figure 7:
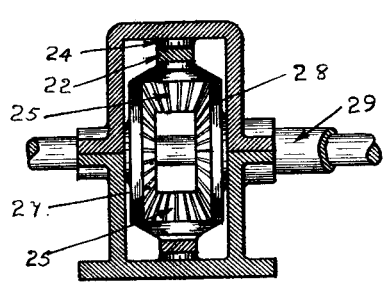
Figure 8:
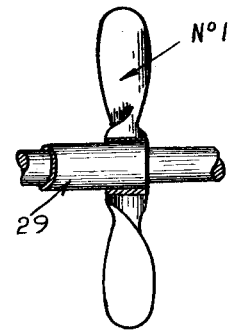

In the accompanying drawings:—Figure 1 is a side elevation of the main driving gear case. Fig. 2 is a plan view of the device shown in Fig. 1, the top half of the case and the intermediate gears being removed. Fig. 3 is a cross section on the line A—A of Fig. 1. Fig. 4 is a detail view, partly in section, of what I call a No. 2 propeller. Fig. 5 is a side elevation of the bevel gear case. Fig. 6 is a plan view of the case shown in Fig. 5 with its cover removed. Fig. 7 is a cross section on the line B—B of Fig. 5. Fig. 8 is a detail view, partly in section, showing what I call a No. 1 propeller. Fig. 9 is a side elevation of a boat showing the general arrangement of the motor, propellers and power transmission mechanism, arranged according to my invention. Fig. 10 is an end view of the boat shown in Fig. 9.

Throughout the separate views the same part is designated by the same reference character.

Referring more particularly to the drawings, 1 is a casing for the main driving gear which is split along a central horizontal line as clearly shown in Fig. 1 and which is held together by bolts 2 fastening through the flanges 9—9. Mounted in the casing 1 are three shafts 10, 11 and 12 which are mounted in journals 10ª, 11ª and 12ª, respectively, formed half in the base and half in the top of the casing 1. In the top part of the casing 1 I have journaled also two shafts 8 on which are loosely mounted gears 4 and 5. The gears 4 and 5 are always in mesh with gears 6 and 7, respectively, which are loosely mounted on the shafts 10 and 12, respectively, each of the gears 6 and 7 being provided with a pair of flanges 14—14 by which the gears 4 and 5 are constrained to move or slide along their respective shafts when the gears 6 and 7 are shifted. In order that the gears 6 and 7 may be shifted they are each provided with collar 6ª provided with a groove 35. A pin 36 is carried by a strap 37 and projects into the groove 35 and the strap 37 is mounted at the end of the lever 16 which projects through the top of the casing as clearly shown in Fig. 3, and is pivoted at point 17 on the lug 18.

The central shaft 11 is extended through the casing 1 in both directions and the end marked 13 in Fig. 2, is connected to the engine 32 as indicated in Fig. 9. The shaft 11 also carries a fixed gear 3 and it will be understood that when the gears 6 and 7 are in the position shown in full lines in Fig. 2, that the small gears 4 and 5 are then in mesh with the central gear 3, and the gears 6 and 7 are consequently driven from the central shaft. However, when the gears 6 and 7 are shifted into the dotted position shown in Fig. 2 and indicated by the reference numeral 15, the gears 4 and 5 are then out of mesh with the central gear 3 and shafts 10 and 12 are not turned.

The shafts 10, 11 and 12 extend from the casing 1 toward the stern of the boat and adjacent the casing 1 is a second casing 21 also made in two halves in a manner similar to that already described in connection with casing 1, and held together by means of bolts such as 26. The flanges on the two halves of the casing 21 furnish bearings for the shafts 10, 11 and 12, all of which extend entirely through the casing 21. Both halves of the casing 21 are provided with interiorly projecting lugs such as 24 to which are bolted two similar strips or bars of metal indicated by reference characters 22 and each of the bars 22 has journaled thereon three bevel gears such as 25. The bevel gears 25 mesh with bevel gears 27 which are fixed on the shafts 10, 11 and 12 and are driven thereby. The bevel gears 25 also mesh with a second set of gears 28, the axes of which are in alinement with the shafts 10, 11 and 12 but which are fastened to sleeves 29 one of which surrounds each of the shafts 10, 11 and 12. Consequently, the sleeves 29 are driven from the shafts 10, 11 and 12 but in opposite directions by means of the gears 27, pinions 25 and gears 28. From the casing 21, the shafts 10, 11 and 12, as well as the corresponding sleeves 29, extend through the rear of the boat or vessel, and, as clearly shown in Fig. 9, the shafts 10, 11 and 12 extend beyond the end of the corresponding sleeves and each one of said shafts is fitted with a propeller which I have designated as No. 2 propeller. Each of the sleeves 29 is also provided with a propeller which I have designated as No. 1 propeller. Consequently it will be seen that the propellers Nos. 1 and 2 revolve in opposite directions which is highly to be desired in case the motors are high speed machines.

It will be understood that while I have shown and described the preferred form of my invention, that I do not wish to be limited thereto but contemplate all such modifications and variations thereof as are mechanically equivalent of the apparatus shown and described herein.

Having thus described my invention what I claim is:—

1. In a power boat in combination, a motor, a shaft for said motor prolonged to serve as a propeller shaft, a plurality of propeller shafts in addition to the motor shaft, propeller driving sleeves mounted on and surrounding said propeller shafts, and means for driving said additional shafts and said sleeves from said motor comprising beveled gears mounted one on each of said propeller shafts, beveled gears alined with said first mentioned beveled gears and mounted one on each of said propeller sleeves, pinions meshing with both of said beveled gears, and gearing connections between said motor shaft and said additional shafts, said gearing being capable of being disconnected at will.

2. In a power boat in combination, a motor, a shaft for said motor prolonged to serve as a propeller shaft, a plurality of propeller shafts in addition to the motor shaft, propeller driving sleeves mounted on and surrounding said propeller shafts, and means for driving said additional shafts and said sleeves from said motor comprising beveled gears mounted one on each of said propeller shafts, beveled gears alined with said first mentioned beveled gears and mounted one on each of said propeller sleeves, pinions meshing with both of said beveled gears, and gearing connections between said motor shaft and said additional shafts, said gearing being arranged to disconnect any of said additional shafts as desired.

3. In a power boat in combination, a motor, a shaft for said motor prolonged to serve as a propeller shaft, a plurality of propeller shafts in addition to the motor shaft, propeller driving sleeves mounted on and surrounding said propeller shafts, and means for driving said additional shafts and said sleeves from said motor comprising beveled gears mounted one on each of said propeller shafts, beveled gears alined with said first mentioned beveled gears and mounted one on each of said propeller sleeves, pinions meshing with both of said beveled gears, and gearing connections between said motor shaft and said additional shafts, said gearing comprising a central gear on said motor shaft, slidably mounted gears on said additional shafts, and means for sliding said additional gears to throw the same out of action.

4. In a power boat in combination, a motor, a shaft for said motor prolonged to serve as a propeller shaft, a plurality of propeller shafts in addition to the motor shaft, propeller driving sleeves mounted on and surrounding said propeller shafts, and means for driving said additional shafts and sleeves from said motor comprising beveled gears mounted one on each of said propeller shafts, beveled gears alined with said first mentioned beveled gears and mounted one on each of said propeller sleeves, pinions meshing with both of said beveled gears, said beveled gearing comprising a fixed gear on said motor shaft, pinions meshing with said fixed gear, and gears mounted on said additional shafts, meshing with said pinions, said pinions and said last mentioned gears being shiftable axially and the gears on said additional shafts being flanged so that the pinions are constrained to move therewith, and means for sliding said additional gears to throw said pinions out of mesh with the gear on the motor shaft.

5. In a power boat in combination, a motor, a shaft for said motor prolonged to serve as a propeller shaft, a plurality of propeller shafts in addition to the motor shaft, propeller driving sleeves mounted on and surrounding said propeller shafts, and means for driving said additional shafts and said sleeves from said motor comprising beveled gears mounted one on each of said propeller shafts, beveled gears alined with said first mentioned beveled gears and mounted one on each of said propeller sleeves, pinions meshing with both of said beveled gears, said beveled gearing comprising a fixed gear on said motor shaft, pinions meshing with said fixed gear, and gears mounted on said additional shafts, meshing with said pinions, said pinions and said last mentioned gears being shiftable axially and the gears on said additional shafts being flanged so that the pinions are constrained to move therewith, and means for sliding said additional gears to throw said pinions out of mesh with the gear on the motor shaft, said means being arranged to move the gear on either additional shaft independently.

In testimony whereof I affix my signature in the presence of two witnesses.

ANDREW WALLIS TUFFORD.

Witnesses:
D. S. TOVELL,
H. M. CHRISTMAN.

Copies of this patent may be obtained for five cents each, by addressing the "Commissioner of Patents. Washington, D. C."